United States Patent [19]

Scheitlin et al.

[11] 4,049,388
[45] Sept. 20, 1977

[54] CENTER AIR MANIFOLD FOR CATALYTIC CONVERTER

[75] Inventors: George Edward Scheitlin; Richard Frederick Little, both of Columbus, Ind.

[73] Assignee: Arvin Industries, Inc., Columbus, Ind.

[21] Appl. No.: 704,240

[22] Filed: July 12, 1976

[51] Int. Cl.$^2$ .......................... B01J 8/00; F01N 3/15
[52] U.S. Cl. ........................... 23/288 FB; 23/288 FC; 60/301
[58] Field of Search ........ 23/288 F, 288 FB, 288 FC; 60/301

[56] References Cited

U.S. PATENT DOCUMENTS

| | | | |
|---|---|---|---|
| 2,772,147 | 11/1956 | Bowen et al. | 23/288 F |
| 3,220,805 | 11/1965 | Fowler et al. | 23/288 F |
| 3,544,264 | 12/1970 | Hardison | 23/288 FB X |
| 3,598,540 | 8/1971 | Chase | 23/288 F |
| 3,662,540 | 5/1972 | Murphey | 23/288 FB X |
| 3,733,829 | 5/1973 | Henault | 23/288 FB UX |
| 3,771,969 | 11/1973 | Scheitlin | 23/288 FB |
| 3,773,894 | 11/1973 | Bernstein et al. | 23/288 FB X |
| 3,912,459 | 10/1975 | Kearsley | 23/288 FC |
| 3,927,984 | 12/1975 | Hartley | 23/288 F |
| 3,930,805 | 1/1976 | Vogt et al. | 23/288 FB X |
| 3,978,567 | 9/1976 | Vroman | 23/288 FC X |

Primary Examiner—Barry S. Richman
Attorney, Agent, or Firm—Jenkins, Coffey & Hyland

[57] ABSTRACT

A catalytic converter includes a shell defining first and second shell portions. A first substrate supports a reducing catalyst in the first shell portion. A second substrate supports an oxidizing catalyst in the second shell portion. The shell further includes inlet and outlet passageways. The inlet passageway is disposed in the shell adjacent the first shell portion and allows combustion products to enter the shell. The outlet passageway is disposed adjacent the second shell portion and allows combustion products to exit from the shell. A third passageway located longitudinally between the first and second shell portion allows combustion product to flow readily from the first shell portion into the second shell portion. A manifold introduces air into the combustion product flowing through the third passageway and an air fitting provides access to the manifold through an exterior wall of the shell. The manifold extends perimetrally at least partially about, and conforms to the interior wall of, the shell in the third passageway. The manifold has a plurality of apertures which open inwardly to direct a plurality of streams of air from the manifold into the stream of combustion product flowing through the third passageway. The converter can be of a "clam shell" type, having first and second longitudinal shell halves, or it can have a one-piece main shell portion.

5 Claims, 10 Drawing Figures

CENTER AIR MANIFOLD FOR CATALYTIC CONVERTER

This invention relates to catalytic converters and specifically to converters of the two-stage type. The invention is especially useful in exhaust gas treatment systems for vehicles powered by internal combustion engines.

Two-stage catalytic converters include a first, or reducing, catalyst and a second, or oxidizing, catalyst. Air is introduced into the combustion product gases passing through the converter after such gases have been treated in the reducing catalyst. The air, introduced into such gases before the combustion product is treated in the oxidizing catalyst, aids in oxidation of the combustion product. Two-stage catalytic converters of the type with which this invention deals are known in the prior art. See, for example, Scheitlin, U.S. Pat. No. 3,771,969; Scheitlin et al., U.S. Pat. No. 3,740,197; and Scheitlin et al., U.S. Pat. No. 3,090,677.

Such two-stage catalytic converters include shells defining first and second shell portions. The second shell portion is downstream from the first in the path of combustion product flow through the shell. The first, upstream shell portion houses a substrate which presents, in the stream of combustion product flow past the substrate, a reducing catalyst. Typically, the purpose of such reducing catalyst is to reduce harmful and deleterious oxides, such as oxides of nitrogen, appearing in the combustion product into harmless gases, e.g., nitrogen and oxygen. The second, downstream shell portion houses a substrate which contains an oxidizing catalyst. Typically, the oxidizing catalyst is used to complete the oxidation of harmful and deleterious gases appearing in the combustion product as a result of incomplete combustion, e.g., carbon monoxide and unburned hydrocarbons, into harmless gases, e.g., carbon dioxide and water vapor.

As the aforementioned prior art patents disclose, an accepted practice in such two-stage converters is to introduce additional oxygen from an external source, e.g., atmospheric air outside the shell, into the shell downstream in the combustion product flow from the reducing site and upstream from the oxidizing site. The additional oxygen is used to oxidize the carbon monoxide and unburned hydrocarbons. The above-mentioned prior art references also disclose that the air is introduced into the catalytic converter through an "air tube" which extends transversely of the longitudinal axis of the converter between two opposed portions of the side wall thereof. The air tube, which in the prior art patents has an elongated cylindrical shape, is provided with a plurality of apertures located to provide some mixing of oxygen from the external source with the combustion product gases flowing into the oxidizing portion of the shell.

The present invention constitutes an improved apparatus for introducing oxygen from the external source into the flowing stream of combustion product between the first, or upstream, shell portion and the second, or downstream, shell portion.

It is an object of the present invention to provide a manifold which promotes mixing of the oxygen from the external source with the stream of combustion product.

It is a further object of the present invention to provide such a manifold which can be adapted readily for use with catalytic converter shells having longitudinally extending seams. Such shells are conventionally referred to as "clam shells".

In accordance with the invention, a catalytic converter includes a shell defining first and second shell portions, a first substrate for supporting a reducing catalyst, and a second substrate for supporting an oxidizing catalyst. The first substrate is disposed in the first shell portion and the second substrate is disposed in the second shell portion. The shell further includes means defining inlet and outlet passageways. The inlet passageway is disposed in the shell adjacent the first shell portion and allows combustion products to enter the shell. The outlet passageway is disposed adjacent the second shell portion and allows combustion products to exit from the shell. A third, or communicating, passageway located longitudinally between the first and second shell portion allows communication therebetween, so that combustion product can flow readily from the first shell portion into the second shell portion. The invention includes means for introducing air into the combustion product flowing through the third passageway and means for providing access to the air introducing means through an exterior wall of the shell. The air introducing means comprises a manifold which extends perimetrally about at least a portion of the interior wall of the shell in the third passageway. The manifold conforms to the interior wall of the shell in the third passageway. The manifold has a plurality of apertures which open inwardly to direct a plurality of streams of air from the manifold into the stream of combustion product flowing through the third passageway.

According to one preferred embodiment of the invention, the manifold extends about the entire interior wall of the shell in the third passageway and the air introducing apertures open inwardly to direct air generally perpendicularly of the direction of combustion product flow through the third passageway. It will be appreciated, however, that the manifold may extend only about a portion of the interior wall of the shell.

Further, according to a first embodiment of the present invention, the converter is of a "clam shell" type, having first and second longitudinal shell halves, and the manifold comprises first and second manifold halves. Each of the manifold halves is secured, before assembly of the clam shell, into a respective one of the shell halves. Means for providing access to the manifold comprises an air passage in each of the manifold halves. Each of these air passages communicates with the corresponding air passage on the other manifold half when the halves of the clam shell are joined together. An external air fitting is provided through one of the clam shell halves into the manifold. Air supplied therethrough flows through the communicating air passage to reach the other manifold half.

According to another embodiment of the present invention, the shell comprises a generally cylindrical shell main portion having a round or oval cross section and first and second ends. The means for defining inlet and outlet passageways includes an inlet head for attachment to the first end and an outlet head for attachment to the second end. The manifold, as before, is shaped to conform to the wall of the third passageway. The manifold is inserted into the shell main portion prior to attachment of the latter of the inlet and outlet heads to the shell. Desirably, the manifold comprises a forward half and a rearward half. The manifold halves are provided with surfaces which define the plurality of air introducing apertures. As in the previously described embodiment, such apertures desirably open inwardly to direct air generally perpendicular of the direction of combustion product flow.

The invention may best be understood by referring to the following description and accompanying drawings which illustrate the invention. In the drawings:

FIG. 1 is a side elevational view of a clam-shell type catalytic converter partly broken away to show various interior details;

FIGS. 1a–c are details of structures resulting from three methods of joining the halves of the converter of FIG. 1;

Figure 1:
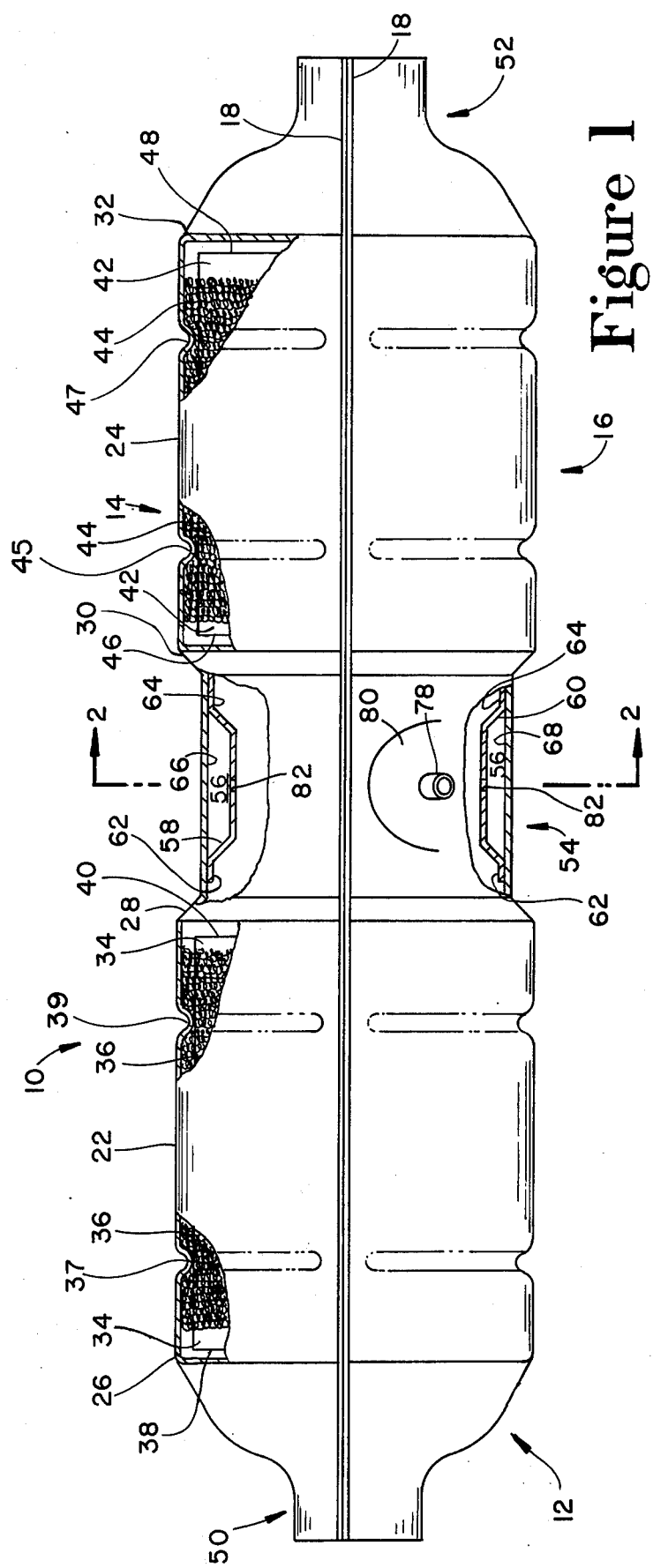
Figure 1C:
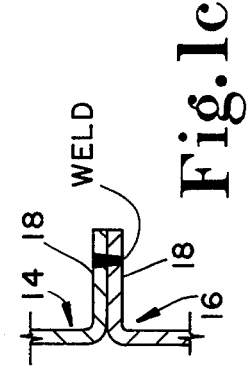
Figure 1B:
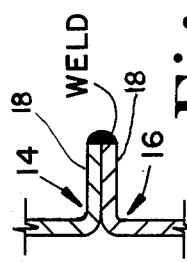
Figure 1A:
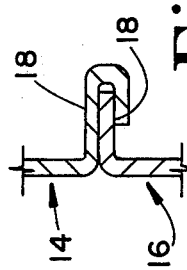

In the embodiment of FIGS. 1-4, the converter 10 comprises a shell of the clam-shell type including an upper shell half 14 and a lower shell half 16. Shell halves 14, 16 conventionally are steel stampings. Each half 14, 16 includes, about its perimeter, a flange 18. In final assembly, halves 14, 16 are welded or otherwise joined along flanges 18, e.g., by any method which results in a structure such as one of the structures illustrated in FIGS. 1a–c.

Halves 14, 16 are formed to provide a first, or upstream, shell portion 22 and a second, or downstream, shell portion 24. Upstream shell portion 22 is bounded at its upper and lower ends, respectively, by ridges 26, 28. Downstream shell portion 24 is bounded at its upper and lower ends by ridges 30, 32, respectively.

Upstream portion 22 houses a substrate 34 surrounded by one or more layers of woven wire cloth 36. A fibrous blanket could be used instead of wire cloth 36. Substrate 34 and wire cloth 36 are held in place within shell 12 by a pair of ridges 37 and 39. Movement of substrate 34 and wire cloth 36 within portion 22 is limited by ridges 26, 28. Cloth 36 insulates substrate 34 from mechanical shock and vibration which might otherwise damage the substrate. Ridges 37 and 39 may somewhat reduce exhaust flow between substrate 34 and shell 12 when wire cloth 36 is used. Substrate 34 contains a large number of pores (not shown) which extend longitudinally through the substrate from a first transversely extending surface 38 to a second transversely extending surface 40 thereof. The walls of such pores are coated with a suitable reducing catalyst.

Ridges 30, 32 of second shell portion 24 limit the movement of a substrate 42 located therein. Substrate 42 is wrapped with one or more layers of woven wire, vibration-insulating cloth 44. Substrate 42 is held in place by a pair of ridges 45, 47. Ridges 45, 47 reduce exhaust gas flow between shell 12 and substrate 42 when wire cloth 44 is used.

Substrate 42 includes first and second transversely extending surfaces 46, 48 between which surfaces extend a large number of pores (not shown). The wall of such pores are coated with a suitable oxidizing catalyst.

Shell 12 further includes, upstream from surface 38 of substrate 34, an inlet passageway 50. Inlet passageway 50 conducts combustion products from the internal combustion engine to the interior of converter 10. Downstream from surface 48 of substrate 42, shell 12 provides an outlet passageway 52 to be converted to a muffler and tail pipe assembly. In the illustrated embodiment, inlet and outlet passageways 50, 52 are axially aligned with the flow of exhaust gases through converter 10. It is to be understood that these passageways need not be so aligned.

Shell 12 further includes, in the region defined between ridges 28, 30, a third communicating passageway 54 between the first and second shell portions 22, 24. Passageway 54 conducts combustion products, flowing outwardly from surface 40 of substrate 34, downstream and to enter substrate 42 through surface 46 thereof.

Disposed within passageway 54 are means 56 for introducing air into the stream of combustion products flowing through passageway 54. Means 56 includes a pair 58, 60 of channel-shaped sheet metal manifold stampings made to conform to the insides of shell 12 upper half 14 and lower half 16, respectively. These air manifold stampings 58, 60 are fastened along their leading- and trailing-edge flanges 62, 64, respectively, to the contoured inner walls 66, 68 of shell halves 14, 16.

Figure 2:
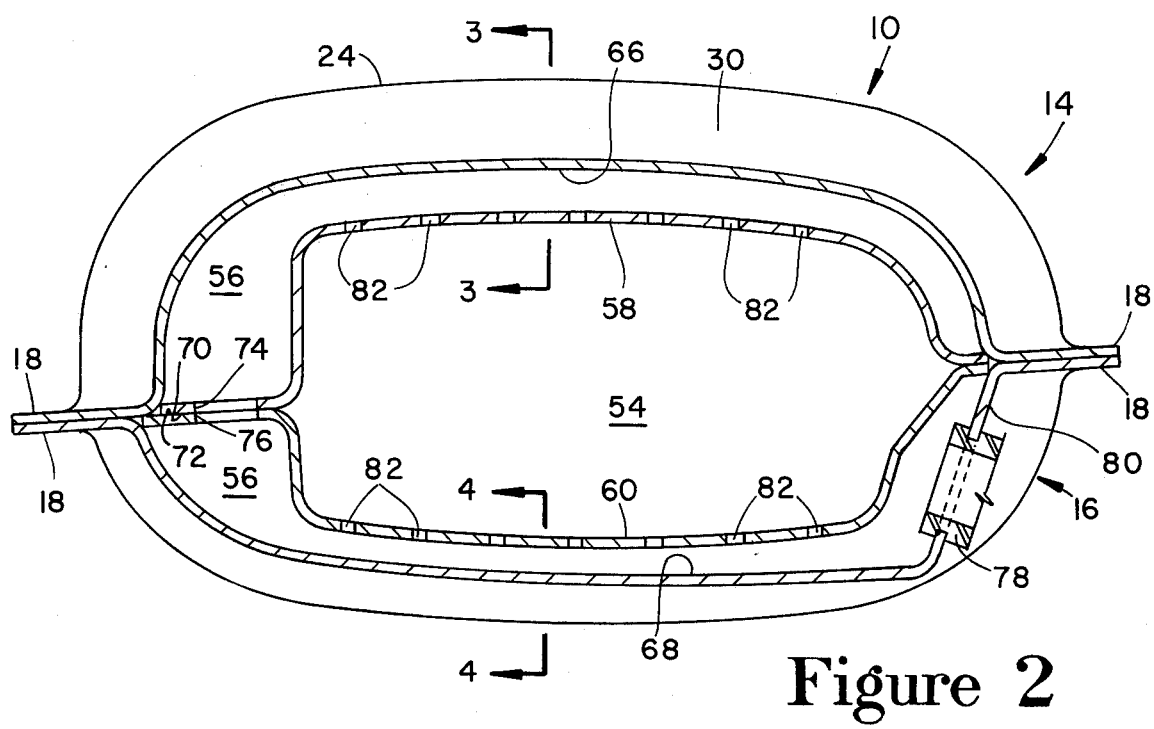
FIG. 2 is a sectional view of the catalytic converter of FIG. 1 taken along section lines 2—2 thereof.
Figure 3A:
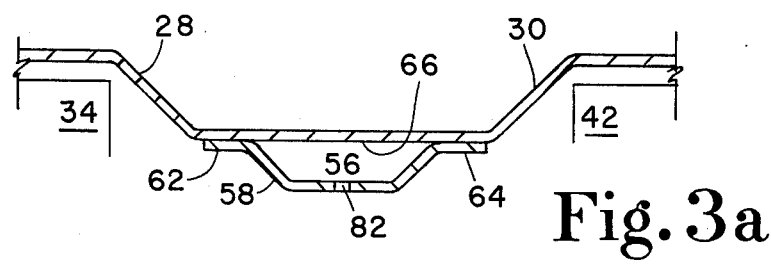
FIGS. 3a and 3b are fragmentary sectional views, taken along section lines 3—3 of FIG. 2, showing alternative shapes for the manifold upper half.
Figure 3B:
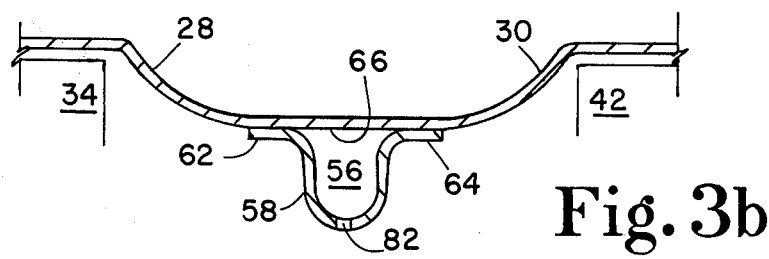
Figure 4:
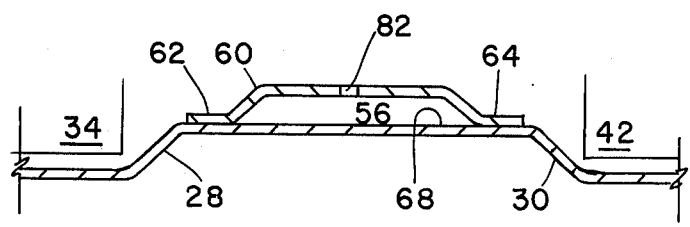
FIG. 4 is a fragmentary sectional view of the converter, taken along section lines 4—4 of FIG. 2, showing in detail a cross section of the lower half of the manifold.

Manifold stampings 58, 60 further include mating surfaces 70, 72, respectively (FIG. 2). Surfaces 70, 72 are provided with corresponding air passages 74, 76, respectively, which are in alignment with one another when shell halves 14, 16 are assembled. Illustratively, access is provided to lower manifold half 60 through an air fitting 78 provided on a flat 80 which is stamped into lower shell half 16. Fitting 78 could be provided to upper manifold half 58 instead of lower manifold half 60.

Air provided through fitting 78 fills the area formed by both manifold halves 58, 60. A plurality of apertures 82 extend longitudinally of each of manifold halves 58, 60 (transversely of the general direction of flow of combustion products through passageway 54). Apertures 82 open toward passageway 54 to direct a plurality of streams of air from manifold 56 into the combustion product flowing through passageway 54. Apertures 82 open into the passageway to direct air generally perpendicularly of the direction of combustion product flow in passageway 54 into such flow. Fitting 78 is connected to an appropriate source, e.g., an air pump (not shown), to supply air to the flowing combustion product in passageway 54.

In operation, combustion products flow first through inlet passageway 50 into shell 12. The combustion products pass through the pores extending between surfaces 38 and 40, and therein are exposed to the action of the reducing catalyst with which the walls of these pores are coated. Next, the partly reduced mixture of combustion products passes through passageway 54 wherein the mixture is enriched with oxygen in the air supplied through fitting 78 and apertures 82 in manifold 56. The oxygen-enriched, partly reduced combustion products then flow through pores which extend between surfaces 46, 48. In such pores, the combustion product is exposed to the action of the oxidizing catalyst with which the walls of those pores are coated. Finally, the combustion product, which has been subjected to both reduction and oxidation catalysis, passes out of shell 12 through outlet passageway 52.

Figure 5:
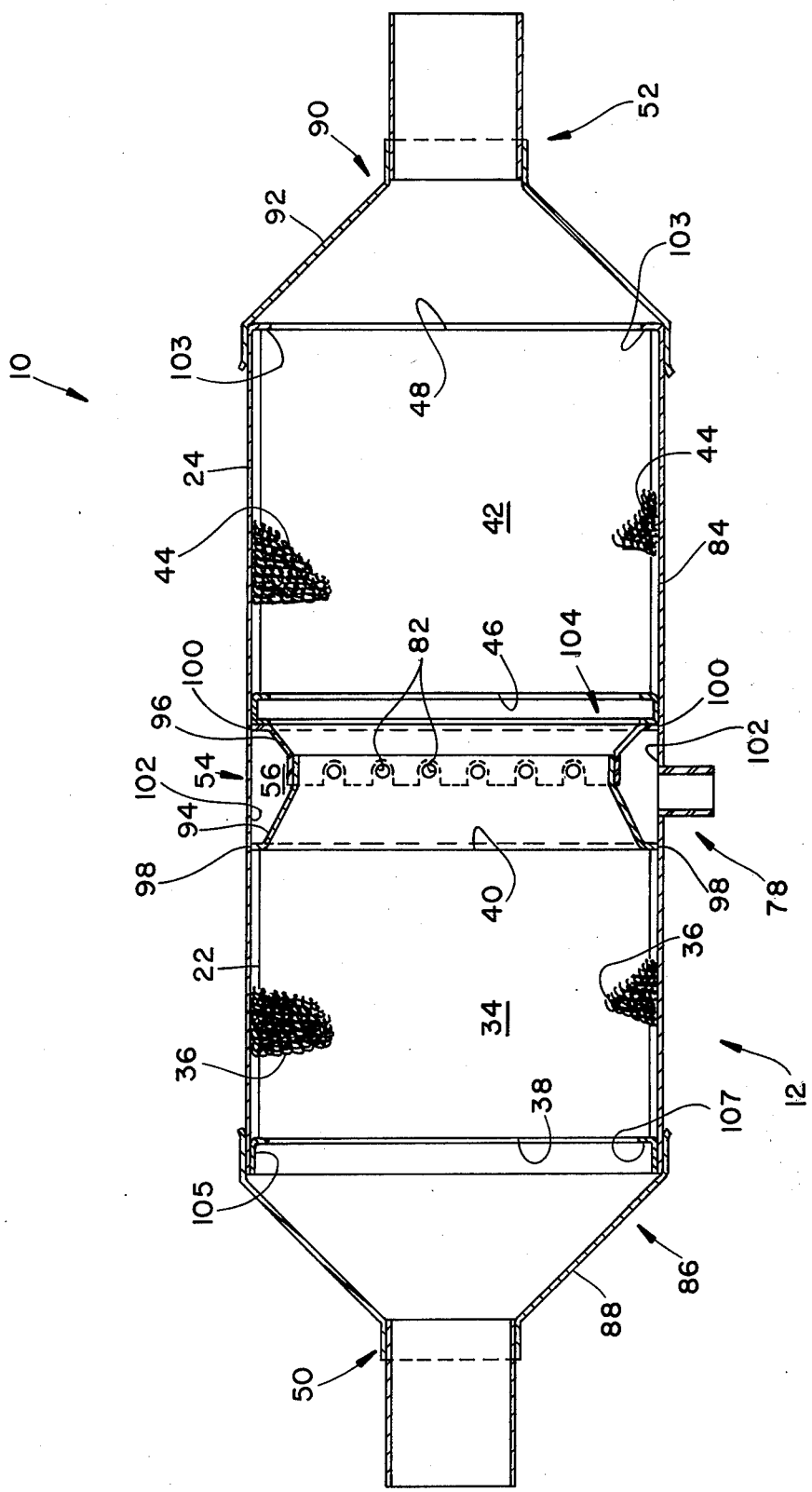
FIG. 5 is a top plan view, partly cut away, of another catalytic converter embodying the present invention.
Figure 6:
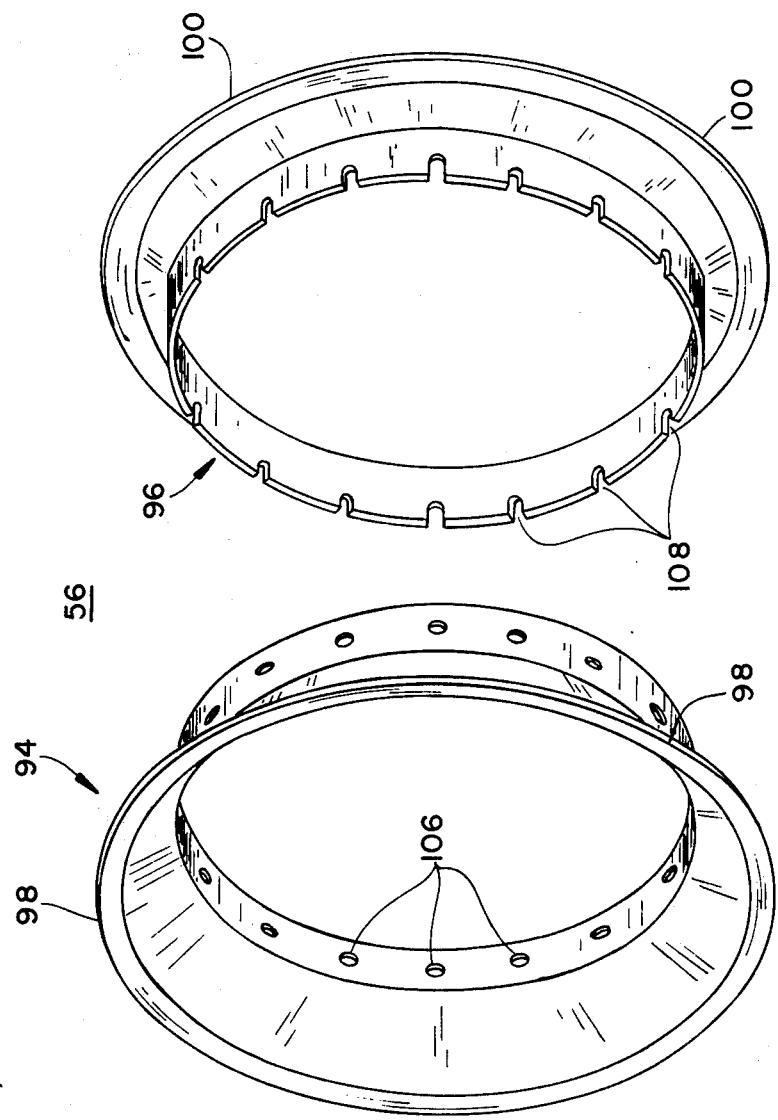
FIG. 6 is an exploded perspective view of the manifold of the converter of FIG. 5.

In the embodiment of the invention illustrated in FIGS. 5 and 6, those elements numbered identically with the embodiment of FIGS. 1–4 perform the same or similar functions. In the embodiment of FIGS. 5 and 6, shell 12 comprises a right cylinder 84, which can be of round or elliptical transverse section. Cylinder 84 is closed at a first, or inlet end 86 by an inlet head 88. Inlet head 88 provides inlet passageway 50. Cylinder 84 is closed at a second, or outlet, end 90 by an outlet head 92 which provides outlet passageway 52. In this embodiment, the catalyst substrates and air manifold may be inserted into end 86 before head 88 is attached to cylinder 84. Also in this embodiment, the function of dividing the interior of the converter 10 into a first portion 22 containing the reduction catalyst-carrying substrate 34 and a second portion 24 containing the oxidizing catalyst-carrying substrate 42 is performed by the air manifold 56. The air manifold 56 is constructed from two annular stampings 94, 96 which form the forward, or upstream, and rearward, or downstream, halves, respectively, of manifold 56. The outer peripheries 98, 100 of stampings 94, 96, respectively, conform to the inside wall 102 of cylinder 84.

The rearward end 90 of cylinder 84 is formed to provide an annular flange 103 which extends radially inwardly. Substrate 42, wrapped in cloth 44, is slidingly inserted into cylinder 84. A retainer ring 104 having a C-shaped radial cross section is then inserted into cylinder 84. While substrate 42 is held against flange 103 with substantial preload, e.g., 1,000 lbs., retainer ring 104 is attached, e.g., by welding, to the inner wall 102 of cylinder 84. Such preloading assures the position of the substrate within the shell.

Stampings 94, 96 are then joined, e.g., by welding, and are inserted into cylinder 84 to a position adjacent retainer ring 104. Substrate 34, wrapped in wire cloth 36, is then inserted into the cylinder 84. An annular retainer ring 105 having a rearward, radially extending flange 107 is inserted into cylinder 84 and is pressed against forward face 38 of substrate 34 with a substantial preload, e.g., 1,000 lbs. While the preload is being exerted upon retainer ring 105, the ring is attached, e.g., by welding, to the internal wall 102 of cylinder 84. The converter 10 is then closed by attachment of inlet head 88 and outlet head 92 to the inlet and outlet heads 86, 90, respectively thereof. An air fitting 78 is connected through the outer wall of cylinder 84 directly into manifold 56.

As best illustrated in FIG. 6, apertures 82 are provided in assembled manifold 56 by a plurality of holes 106 in stamping 94 and an equal plurality of axially extending slots 108 in stamping 94. Slots 108 have a slightly larger transverse dimension than the diameter of holes 106. This provides increased tolerance in the alignment of holes 106 in slots 108 during assembly of manifold 56 of this embodiment.

The disclosed construction for a catalytic converter 10 results in a good oxygen enrichment of the combustion product flowing into the oxidizing portion 24 of the converter. This oxygen distribution is achieved without significant additional cost over a two-stage converter without an oxygen enrichment apparatus. The added cost is low due to the use of inexpensive stamped sheet metal channel sections 58, 60, 94, 96 to form the manifold 56. An additional advantage of such channel-shaped manifold sections is that they can provide the necessary flanges 62, 64 for attachment of the channel sections to the interior wall 66, 68 of the shell 12.

As used in this description and in the appended claims, the word "substrate" is understood to include bead-shaped substrates covered with catalyst material and placed in gas permeable containers as well as unitary substrate structures of the type illustrated.

The manifolds in the two disclosed embodiments extend completely about the interior walls of the illustrated converters. It is to be understood, however, that significant mixing can be achieved with a manifold that extends about a substantial portion, e.g., half, of the converter interior wall. For example, in the embodiment of FIGS. 1–4, satisfactory mixing can be achieved using manifold section 60 without section 58.

What is claimed is:

1. In a catalytic converter for combustion product comprising a shell defining first and second longitudinally spaced apart shell portions, said shell having an interior wall, a first substrate containing a reducing catalyst, the first substrate dispoed in the first shell portion, a second substrate containing an oxidizing catalyst, the second substrate disposed in the second shell portion, said shell further having an inlet for introducing combustion product into the first shell portion and an outlet for exhausting combustion product from the second shell portion, and a third passageway providing communication between the first and second shell portions, means for introducing air into the combustion product flowing longitudinally through the third passageway and means for providing access to the air introducing means through the shell, the improvement wherein the air introducing means comprises at least one channel section, the at least one channel section being formed to extend perimetrally substantially completely about the interior wall of the shell generally transversely to combustion product flow through the third passageway, the at least one channel section including upstream and downstream edge portions for engaging the interior wall of the shell and an intermediate portion extending between the upstream and downstream edge portions for defining between the channel section and the shell interior wall a manifold, said manifold including a plurality of apertures opening inwardly for directing a plurality of streams containing air from the manifold into the combustion product.

2. The improvement of claim 1 wherein the apertures direct air containing streams generally perpendicularly of the direction of combustion product flow in the third passageway.

3. The improvement of claim 1 wherein the shell comprises first and second shell halves and the air introducing means comprises corresponding first and second channel sections, each secured into a respective one of the shell halves, and the means for providing access to the air introducing means comprises an air passage in each of the channel sections for communicating with the corresponding air passage on the other channel section in the assembled shell, and an air fitting in an exterior wall of one of the shell halves for providing access to one of the channel sections and thence to the other through the communicating air passages.

4. In a catalytic converter for combustion product comprising a shell defining first and second longitudinally spaced apart shell portions, said shell having an interior wall, said shell further comprising a generally cylindrical shell main portion having first and second ends, a first substrate containing a reducing catalyst, the first substrate disposed in the first shell portion, a second substrate containing an oxidizing catalyst, the second substrate disposed in the second shell portion, said shell further having means defining an inlet passageway for admitting combustion products into the first shell portion and an outlet passageway for exhausting combustion products from the second shell portion, the means for defining an inlet passageway including an inlet head attached to the first end of the shell, the means for defining an outlet passageway including an outlet head attached to the second end of the shell, and a third passageway providing communication between the first and second shell portions, means for introducing air into the combustion product flowing longitudinally through the third passageway and means for providing access to the air introducing means through the shell, the improvement wherein the air introducing means comprises a manifold extending perimetrally about at least a substantial portion of the interior wall of the shell, the manifold having a plurality of apertures opening inwardly for directing a plurality of streams containing air from the manifold into the combustion product, the manifold having at least one surface shaped to conform to the wall of the shell main portion, the manifold comprising an upstream manifold portion and a downstream manifold portion, one of the manifold portions including a plurality of peripherally spaced apart, inwardly opening holes, and the other manifold portion including an equal plurality of peripherally spaced slots cooperating with the holes in the assembled converter for providing the air introducing apertures, the air introducing apertures opening inwardly to direct air generally perpendicularly of the longitudinal direction of combustion product flow in the third passageway.

5. A two-stage catalytic converter comprising a shell having an interior wall defining a first reducing catalyst housing portion and a second oxidizing catalyst housing portion, the shell further including means defining an inlet opening for admitting combustion products into the converter upstream from the first housing portion and an outlet opening for exhausting combustion products from the converter downstream from the second housing portion, first means for supporting a reducing catalyst along the path of combustion product flow through the converter, the first means being disposed in the first housing portion, second means for supporting an oxidizing catalyst along the path of combustion product flow through the converter, the second means being disposed in the second housing portion, the shell having a passageway for conducting combustion products from the first housing portion to the second, the passageway being disposed between the first and second housing portions, the shell comprising a generally cylindrical main portion having first and second ends, the means defining an inlet opening comprises an inlet head, the means defining an outlet opening comprising an outlet head and a manifold for introducing air into the flowing combustion products, the manifold being disposed in the passageway and having at least one surface conforming to and extending perimetrally about a substantial portion of the shell interior wall, the manifold including means defining a plurality of apertures for directing air into the flow of combustion product through the passageway and means defining an entry port for permitting air to be introduced into the manifold, the manifold including an upstream manifold portion and a downstream manifold portion, each of the portions having an annular shape and a surface conforming to the interior wall of the shell, the air introducing apertures being defined by a plurality of peripherally spaced apart, inwardly opening holes on one of the upstream and downstream manifold portions and an equal plurality of cooperating peripherally spaced, longitudinally extending slots on the other portion.

* * * * *